United States Patent
Iinuma et al.

(10) Patent No.: US 7,775,667 B2
(45) Date of Patent: Aug. 17, 2010

(54) OPTICAL DEVICE AND PROJECTOR

(75) Inventors: Kazuyuki Iinuma, Azumino (JP);
Hiroaki Yanai, Shiojiri (JP); Gaku Nishizawa, Nagano (JP); Takanori Fukuyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 751 days.

(21) Appl. No.: 11/702,332

(22) Filed: Feb. 5, 2007

(65) Prior Publication Data

US 2007/0206157 A1  Sep. 6, 2007

(30) Foreign Application Priority Data

Mar. 6, 2006  (JP)  ............... 2006-059502

(51) Int. Cl.
*G03B 21/00* (2006.01)
*G02F 1/1333* (2006.01)

(52) U.S. Cl. .......................... 353/31; 349/58

(58) Field of Classification Search .............. 353/31, 353/33, 34, 37, 122, 119, 81; 349/58, 8, 349/60, 155
See application file for complete search history.

(56) References Cited

U.S. PATENT DOCUMENTS

| | | | | |
|---|---|---|---|---|
| 6,587,167 B1 * | 7/2003 | Fujimori et al. | ............... | 349/58 |
| 6,906,840 B1 * | 6/2005 | Fujimori et al. | ............. | 359/237 |
| 7,148,945 B2 * | 12/2006 | Yanagisawa | ................. | 349/161 |
| 2004/0114249 A1 * | 6/2004 | Nishihara et al. | ............ | 359/617 |
| 2004/0239886 A1 * | 12/2004 | Yanagisawa | ................. | 353/34 |

FOREIGN PATENT DOCUMENTS

| JP | 2004-198596 A | 7/2004 |
|---|---|---|
| JP | 2004-333685 A | 11/2004 |

* cited by examiner

*Primary Examiner*—William C Dowling
*Assistant Examiner*—Ryan Howard
(74) *Attorney, Agent, or Firm*—AdvantEdge Law Group, LLC

(57) ABSTRACT

An optical device is provided which includes a plurality of optical modulation devices, a plurality of optical elements, and a prism having a plurality of luminous flux incidence surfaces positioned on a luminous flux irradiation-side of each optical element. The optical device includes a holding member which holds at least one of the plurality of optical modulation devices and a pair of light-transmissive substrates. In one implementation, an irradiation-side substrate disposed on the luminous flux irradiation-side of the optical element has a dimension larger than that of the optical element, and the irradiation-side substrate is secured to the luminous flux incidence surface of the prism, an aperture is formed in the holding member, and the holding member is attached to the irradiation-side substrate so as to cover the optical element.

6 Claims, 6 Drawing Sheets

OPTICAL DEVICE AND PROJECTOR

BACKGROUND

1. Technical Field

The present invention relates to an optical device which forms an optical image by modulating an incident luminous flux in accordance with image information, and to a projector equipped with the optical device.

2. Related Art

To date, a projector which forms an optical image in accordance with image information, and projects the optical image enlarged onto a screen or the like, has been known. As this kind of projector, a projector has been known which includes a light source, an optical modulation device which modulates a luminous flux emitted from the light source in accordance with the image information, and a projection lens which projects the modulated luminous flux as the optical image.

In recent years, a so-called 3 LCD projector, which has improved an image quality and a color reproducibility of a formed image, has been conceived. This kind of 3 LCD projector includes a color separation optical system, which separates a luminous flux emitted from a lamp serving as the light source into color light of three colors of red (R), green (G) and blue (B), a plurality of liquid crystal panels, provided for each of the separated color lights, serving as the optical modulation device which modulates an incident color light in accordance with the image information, and a synthesizing optical device which forms the optical image by synthesizing the color light modulated by each liquid crystal panel (for example, refer to JP-A-2004-198596 (pages 5 to 7, FIG. 1)).

In the projector described in JP-A-2004-198596, a polarizing plate main body which adjusts a polarization direction of a light, a pair of glass substrates which sandwich the polarizing plate main body, a frame which holds the polarizing plate main body and the pair of glass substrates, and a retaining spring being provided, they integrally configure a polarizing plate. Then, the polarizing plate is disposed, by means of an attachment plate which attaches the liquid crystal panel to a luminous flux incidence surface of a cross dichroic prism serving as the synthesizing optical device, between the liquid crystal panel and the cross dichroic prism.

However, with the projector described in JP-A-2004-198596, as the number of parts attaching the polarizing plate main body to the cross dichroic prism increases, there is a problem that a configuration of the projector and a manufacturing process become complicated.

In response to this, a configuration is considered in which the polarizing plate main body and the pair of glass substrates sandwiching the polarizing plate main body are adhesively secured and, of the pair of glass substrates, a glass substrate disposed on a luminous flux irradiation-side of the polarizing plate main body is affixed to the luminous flux incidence surface of the cross dichroic prism. In this kind of case, although it is possible to reduce the number of parts involved in attaching the polarizing plate, in the event that the liquid crystal panel is attached via the attachment plate to a luminous flux incidence surface of the polarizing plate main body, adhesive layers interposed between the liquid crystal panel and the cross dichroic prism increase. For this reason, as well as a position adjustment of the liquid crystal panel with respect to the cross dichroic prism becoming difficult, there is a problem in that displacement of the liquid crystal panel can occur due to a weight of the liquid crystal panel etc. along with an aging change of the adhesive layers.

In response to this kind of problem, there has been a demand for a projector which can suppress the displacement of the liquid crystal panel while restraining the increase in the number of parts.

SUMMARY

An advantage of some aspects of the invention is to provide an optical device and a projector which can reduce the number of parts and suppress the displacement of an optical modulation device.

In order to achieve the heretofore described advantage, an optical device according to an aspect of the invention includes: a plurality of optical modulation devices which modulate an incident luminous flux in accordance with image information; a plurality of optical elements provided on a luminous flux irradiation-side of each optical modulation device which optically converts a luminous flux emerging from each of the optical modulation devices; and a prism having a plurality of luminous flux incidence surfaces positioned on a luminous flux irradiation-side of each optical element which forms an optical image by synthesizing a luminous flux emerging from each optical element. The device further includes: a holding member which holds at least one of the plurality of optical modulation devices; and a pair of light-transmissive substrates, disposed on a luminous flux incident-side and the luminous flux irradiation-side of the optical element on which the luminous flux emerging from the optical modulation device held by the holding member falls incident, which sandwiches the optical element. Of the pair of light-transmissive substrates, an irradiation-side substrate disposed on the luminous flux irradiation-side of the optical element has a dimension larger than that of the optical element, the irradiation-side substrate is secured to the luminous flux incidence surface of the prism, an aperture through which the luminous flux emerging from the optical modulation device held by the holding member passes is formed in the holding member, and the holding member is attached to the irradiation-side substrate in such a way as to cover the optical element.

As this kind of optical element, it is possible to exemplify a polarizing film which, of the incident luminous fluxes, transmits a luminous flux having a predetermined polarization direction while blocking a luminous flux having another polarization direction, a view angle control filter which controls a view angle of the optical image, or a color filter which transmits a color light of a predetermined wavelength, or the like.

According to the aspect of the invention, the optical element being sandwiched by the pair of light-transmissive substrates, of the pair of light-transmissive substrates, the irradiation-side substrate disposed on the luminous flux irradiation-side of the optical element is secured to the luminous flux incidence surface of the prism. Then, the optical modulation device is attached to the irradiation-side substrate by means of the holding member. Accordingly, it is possible to easily attach the optical modulation device to the prism via the irradiation-side substrate and the holding member.

Also, unlike the projector described in the heretofore described JP-A-2004-198596, as it is not necessary to newly provide a member such as an attachment plate which secures the optical element to the luminous flux incidence surface of the prism, as well as being possible to restrain the increase in the number of parts, it is possible to easily carry out the attachment of the optical element.

Consequently, as well as being possible to easily carry out the attachment of the optical modulation device and the optical element, it is possible to prevent the configuration of the optical device from becoming complicated.

Furthermore, the holding member which holds the optical modulation device is attached to the irradiation-side substrate adhesively secured to the luminous flux incidence surface of the prism. Accordingly, compared to the case in which the holding member is attached to, of the pair of light-transmissive substrates, the substrate disposed on the luminous flux incident-side of the optical element, it is possible to reduce the number of members interposed between the prism and the optical modulation device. For this reason, it is possible to easily carry out a positioning securing of the optical modulation device to the prism.

Furthermore, with a configuration in which each light-transmissive substrate and optical element are adhesively secured, the irradiation-side substrate configuring the light-transmissive substrates is affixed to the prism, and the holding member is affixed to the light-transmissive substrate disposed on the luminous flux incident-side of the optical element, an adhesive layer exists in each of four places between the holding member and the prism. For this reason, in the event that the displacement occurs due to an aging change of the adhesive layer among parts making contact via, of each adhesive layer, one of the adhesive layers, the position of the optical modulation device with respect to the prism displaces with respect to an optical axis of an emergent luminous flux from the optical modulation device.

In response to this, according to the aspect of the invention, even in the event that the holding member is adhesively secured to the irradiation-side substrate, the adhesive layer is interposed between the holding member and the prism in each of two places. For this reason, as long as no displacement occurs between the prism and the irradiation-side substrate, and between the irradiation-side substrate and the holding member, no displacement of the optical modulation device with respect to the prism will occur. Consequently, the occurrence of the displacement of the optical modulation device with respect to the prism can be further suppressed, and a lengthening of a lifespan of the optical device can be achieved.

In at least one embodiment, the irradiation-side substrate is secured in such a way as to extend from the prism, in a direction substantially perpendicular to an optical axis of a luminous flux which falls incident on the irradiation-side substrate, and that the holding member is attached in a position on a luminous flux incident-side surface of the irradiation-side substrate corresponding to the portion extending from the prism.

According to the aspect of the invention, while it is possible to enlarge a dimension of the optical element, it is possible to downsize a dimension of the prism.

That is, the irradiation-side substrate being provided in such a way as to extend with respect to the prism, the holding member holding the optical modulation device is attached to the portion of the luminous flux incidence surface of the irradiation-side polarizing plate which extends from the prism. Herein, in the event that a dimension of the irradiation-side substrate is equal to or smaller than a dimension of the luminous flux incidence surface of the prism, in order to secure an area on the luminous flux incidence surface of the irradiation-side substrate to which the holding member is attached, the dimension of the optical element becomes smaller with respect to the luminous flux incidence surface of the prism. In this kind of case, a case arises in which substantially all of the luminous fluxes emerging from the optical modulation device may not necessarily fall incident on the optical element. Contrarily, in order to cause all of the luminous fluxes emerging from the optical modulation device to reliably fall incident on the optical element, it is necessary to enlarge the dimension of the irradiation-side substrate. At this time, as a necessity of enlarging the luminous flux incidence surface of the prism arises along with the enlargement of the irradiation-side substrate, a restriction arises in the downsizing of the prism.

In response to this, by making the attachment position of the holding member on the irradiation-side substrate the portion of the irradiation-side substrate which extends from the prism, not only is it possible to match the dimension of the optical element with the dimension of an image formation area of the optical modulation device, but it is also possible to enlarge the dimension of the optical element in order to cause the luminous fluxes to reliably fall incident on the optical element. Consequently, it is possible to prevent an occurrence of wasteful light which does not fall incident on the optical element.

Also, as the irradiation-side substrate is provided in such a way as to extend with respect to the prism, and the holding member is attached to the extending portion, a restriction such as matching the dimension of the luminous flux incidence surface of the prism with the dimension of the irradiation-side substrate is avoided. By this means, as it is possible to match the dimension of the luminous flux incidence surface of the prism with an area illuminated with the luminous flux emerging from the optical element, it is possible to achieve the downsizing of the prism. Consequently, it is possible to achieve the downsizing of the optical device.

Also, as an extension direction of the irradiation-side substrate with respect to the prism is a direction substantially perpendicular to the optical axis of the luminous flux which falls incident to the irradiation-side substrate, and a direction substantially perpendicular to a direction in which the plurality of luminous flux incidence surfaces of the prism is formed, even in the event that the pair of light-transmissive substrates is provided in accordance with another optical element, and the irradiation-side substrate configuring the light-transmissive substrates is disposed on another luminous flux incidence surface of the prism, it is possible to prevent the individual irradiation-side substrates from interfering with each other.

In at least one embodiment, a gap of a predetermined size is provided between, of the pair of light-transmissive substrates, an incident-side substrate disposed on the luminous flux incident-side of the optical element and the optical modulation device held by the holding member.

According to the aspect of the invention, by providing the gap of the predetermined size between the optical modulation device and the incident-side substrate, it is possible to circulate a cooling air between the optical modulation device and the incident-side substrate. Accordingly, not only is it possible to directly cool the optical modulation device with the cooling air, but it is also possible to cool the holding member to which heat of the optical modulation device has been transmitted, and also to cool the incident-side substrate to which heat of the optical element has been transmitted. Consequently, it is possible to increase a cooling efficiency of the optical modulation device and the optical element.

Also, a projector according to another aspect of the invention, which forms an optical image by modulating the luminous flux emitted from the light source in accordance with the image information, and projects the formed optical image, includes the optical device. The optical modulation device is disposed on the optical axis of the luminous flux emitted from the light source.

According to the aspect of the invention, it is possible to achieve the same kind of advantage as with the heretofore described optical device.

That is, it is possible to simplify the configuration and the manufacturing process of the optical device, and by extension it is possible to simplify the configuration and the manufacturing process of the projector. Also, it is possible to suppress the displacement of the optical modulation device with respect to the prism, and the displacement of the optical modulation device with respect to the optical axis of the luminous flux emitted from the light source. Consequently, it is possible to reliably form an appropriate optical image.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereafter, a description will be given of a first embodiment of the invention based on the diagrams.

1. Configuration of Projector 1

Figure 1:
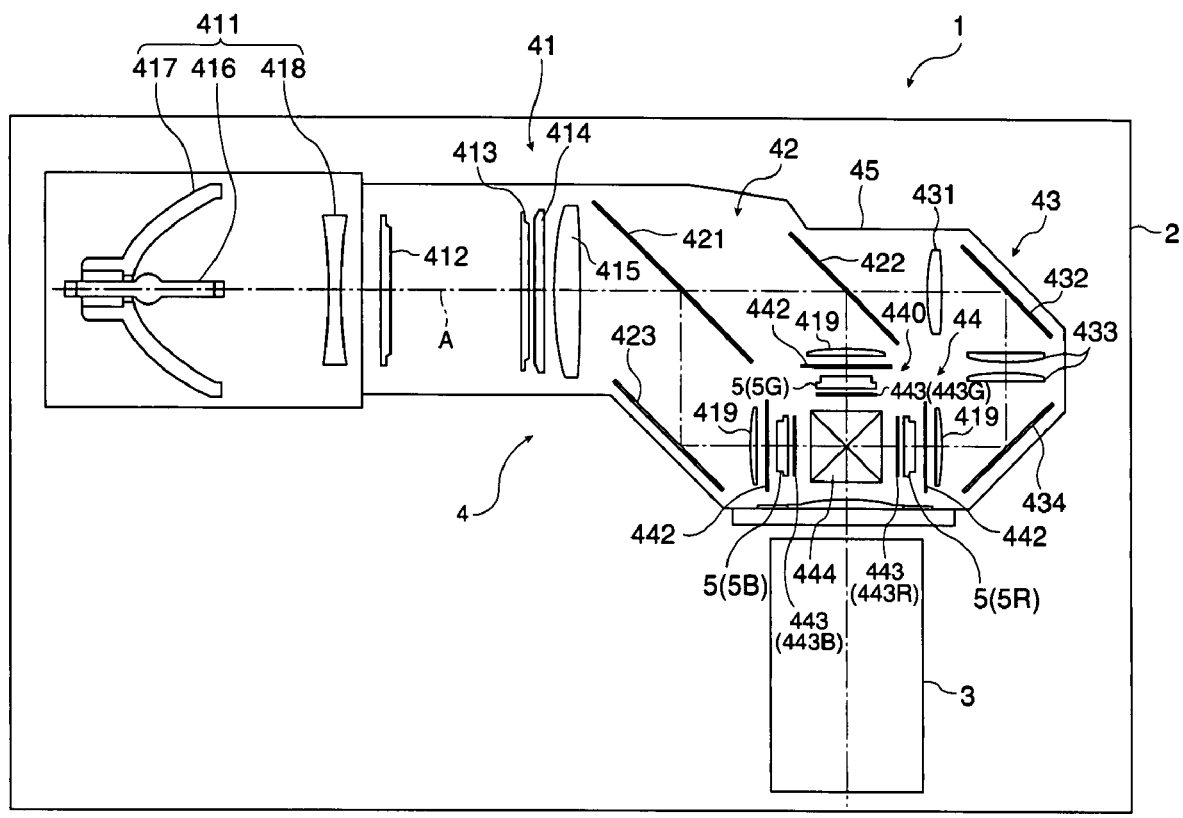
FIG. 1 is a schematic diagram showing a configuration of a projector according to a first embodiment of the invention.

FIG. 1 is a schematic diagram showing an internal configuration of the projector 1 according to the embodiment.

The projector 1 forms an optical image in accordance with received image information, and projects the optical image enlarged onto a screen or the like. The projector 1, as shown in FIG. 1, is configured to include an exterior housing 2, a projection lens 3, an optical unit 4 etc.

In FIG. 1, although omitted in the figure, a cooling unit configured of a cooling fan and the like which cool an inside of the projector 1, a power source unit which supplies an electrical power to each component member of the inside of the projector 1, a control unit which controls a whole of the projector 1, and the like, are disposed inside the exterior housing 2 in a space other than the projection lens 3 and the optical unit 4.

Of these, the exterior housing 2, being configured of a synthetic resin or the like, is formed in an overall approximate rectangular parallelepiped storing the projection lens 3, the optical unit 4 and the like disposed inside. Although omitted in the figure, the exterior housing 2, being configured of an upper case which configures a top surface, a front surface, a back surface, and both of a right and left side surface of the projector 1, and a lower case which configures a bottom surface, the front surface, and the back surface of the projector 1, the upper case and the lower case are secured to each other by a screw or the like. It is acceptable that the exterior housing 2, not being limited to the synthetic resin or the like, is formed of another material, for example, it is acceptable that it is configured of a metal or the like.

The projection lens 3 has a function as a projection optical system which projects the optical image (a color image) formed in the optical unit 4, to be described hereafter, enlarged onto the not-shown screen. The projection lens 3 is configured as a coupling lens in which a plurality of lenses are stored inside a tubular lens tube.

2. Configuration of Optical Unit 4

The optical unit 4 is a unit which, under a control by a control unit, optically processes a luminous flux emitted from a light source, and forms the optical image (the color image) in response to the image information. The optical unit 4, as well as extending along the back surface of the exterior housing 2, has an approximate L-shape in a plan view which extends along a side surface of the exterior housing 2.

The optical unit 4 is furnished with an illumination optical device 41, a color separation optical device 42, a relay optical device 43, an optical device 44, and an optical part housing 45 which stores, of the aforementioned, optical parts 41 to 43 and an incident-side polarizing plate 442 of the optical device 44 disposed inside.

The illumination optical device 41 is an optical system for illuminating substantially uniformly an image formation area of liquid crystal panels 5, to be described hereafter, which configure the optical device 44. The illumination optical device 41 is configured to include a light source device 411, a first lens array 412, a second lens array 413, a polarization converter 414 and a superimposing lens 415.

The light source device 411 is furnished with a light source lamp 416, which emits a radial beam, a reflector 417, which reflects a radiant light emitted from the light source lamp 416 and causes it to converge in a predetermined position, and a parallelizing concave lens 418 which makes a luminous flux converged by the reflector 417 parallel to an illumination optical axis A. It is possible to use a tungsten halogen lamp, a metal halide lamp or a high pressure mercury vapor lamp as this kind of light source lamp 416. Also, the reflector 417, apart from being configurable of an ellipsoidal reflector having an ellipsoid of revolution, can also be configured of a parabolic reflector having a paraboloid of revolution. In this case, it is possible to omit the parallelizing concave lens 418.

The first lens array 412 has a configuration in which small lenses having a contour substantially rectangular as seen from a direction of the optical axis of the incident luminous flux are arrayed in a matrix form. The individual small lenses divide the luminous flux emitted from the light source device 411 into a plurality of partial luminous fluxes.

The second lens array 413, having the same configuration as the first lens array 412, has a configuration in which small lenses are arrayed in a matrix form. The second lens array 413 has a function of, in conjunction with the superimposing lens 415 disposed in a downstream stage of an optical path of the second lens array 413, focusing an image emerging from each small lens of the first lens array 412 onto each of the image formation areas of the liquid crystal panels 5, to be described hereafter, of the optical device 44.

The polarization converter 414, being disposed between the second lens array 413 and the superimposing lens 415, converts the lights from the second lens array 413 into lights having substantially one kind of linear polarization.

Specifically, the individual partial lights converted to have the substantially one kind of linear polarization by the polarization converter 414 are eventually substantially superimposed onto the image formation areas of the liquid crystal panels 5, to be described hereafter, by the superimposing lens 415. In a projector using a liquid crystal panel of a type which modulates a polarized light, as it is only possible to use one kind of polarized light, it is impossible to use substantially half the light from the light source device 411 which emits a random polarized light. For this reason, by using the polarization converter 414, the light emerging from the light source device 411 is converted to have the substantially one kind of linear polarization, thus increasing a light use efficiency in the optical device 44.

The color separation optical device 42, including two dichroic mirrors 421 and 422 and a reflecting mirror 423, functions as a color separation optical system by which the dichroic mirrors 421 and 422 separate the plurality of partial luminous fluxes emitted from the illumination optical device 41 into color lights of three colors, red (R), green (G) and blue (B).

The relay optical device 43, including an incident-side lens 431, relay lenses 433 and reflecting mirrors 432 and 434, has a function of leading the red light separated by the color separation optical device 42 to a red light liquid crystal panel 5 (5R).

At this time, the dichroic mirror 421 of the color separation optical device 42, as well as transmitting a red light component and a green light component of the luminous flux emitted from the illumination optical device 41, reflects a blue light component. The blue light reflected by the dichroic mirror 421 is reflected off the reflecting mirror 423, passes through a field lens 419, and reaches a blue light liquid crystal panel 5 (5B). The field lens 419 converts the individual partial luminous fluxes emerging from the second lens array 413 into a luminous flux parallel to a central axis (a principal ray) of the partial luminous fluxes. The same applies to field lenses 419 provided on light incident-sides of green light and red light liquid crystal panels 5 (5G and 5R).

Of the red light and the green light transmitted through the dichroic mirror 421, the green light is reflected by the dichroic mirror 422, passes through the field lens 419, and reaches the green light liquid crystal panel 5 (5G). Meanwhile, the red light is transmitted through the dichroic mirror 422, passes through the relay optical device 43 and further through the field lens 419, and reaches the red light liquid crystal panel 5 (5R). The reason for the relay optical device 43 being disposed on an optical path of the red light is, as a length of the optical path of the red light is longer than that of other color lights, to prevent the light use efficiency from decreasing due to a diffusion of light and the like. That is, it is in order to transmit partial luminous fluxes incident on the incident-side lens 431 intact to the field lens 419. The relay optical device 43 is configured in such a way as to transmit the red light among the three color lights but, without being limited to this, it is also acceptable to configure in such a way as to transmit, for example, the blue light.

The optical device 44 modulates each of the three color lights emerging from the color separation optical device 42 in accordance with the image information and, by synthesizing each modulated color light, forms the optical image (color image).

The optical device 44 is configured to include the three liquid crystal panels 5 (the red light liquid crystal panel is designated by 5R, the green light liquid crystal panel by 5G and the blue light liquid crystal panel by 5B) as an optical modulation device, three incident-side polarizing plates 442 disposed one on each of luminous flux incident-sides of the liquid crystal panels 5, three irradiation-side polarizing plates 443 disposed one on each of luminous flux irradiation-sides of the liquid crystal panels 5, cross dichroic prism 444 serving as a color synthesizing optical device, holding members 6 (omitted in FIG. 1) which hold the liquid crystal panels 5, and pairs of light-transmissive substrates 7 (omitted in FIG. 1) which sandwich the irradiation-side polarizing plates 443. Of these, an optical device main body 440 is configured of the liquid crystal panels 5, the irradiation-side polarizing plates 443, the cross dichroic prism 444, the holding members 6 and the pairs of light-transmissive substrates 7. A detailed description of the optical device main body 440 will be given hereafter.

Of these, each of the incident-side polarizing plates 442 has each color light uniformed in substantially one polarization direction by the polarization converter 414 fall incident thereon, transmits only a polarized light, among the incident luminous fluxes, having substantially the same direction as the polarization direction of the luminous fluxes uniformed by the polarization converter 414, and absorbs the other luminous fluxes. The incident-side polarizing plates 442 have, for example, a configuration in which a polarizing film is affixed onto a light-transmissive substrate made of sapphire glass, crystal or the like.

The liquid crystal panels 5, having a configuration in which a liquid crystal which is an optical material is hermetically sealed between a pair of transparent glass substrates, controls an orientation of the liquid crystal in the image formation area in accordance with a drive signal received from the control unit, modulates a polarization direction of the polarized luminous flux emerging from the incident-side polarizing plate 442, and forms a color image corresponding to an incident color light.

The irradiation-side polarizing plate 443, corresponding to an optical element in the embodiment of the invention, transmits only a luminous flux, among the luminous fluxes which emerge from the liquid crystal panel 5, having a polarization direction perpendicular to a transmission direction of the luminous flux in the incident-side polarizing plate 442, and absorbs the other luminous fluxes. In the embodiment, the irradiation-side polarizing plate 443 is formed as a film.

The cross dichroic prism 444 is a synthesizing optical device which synthesizes the color lights emerging from the irradiation-side polarizing plates 443 as an R image, a G image and a B image, and forms the optical image (color image). The cross dichroic prism 444 is formed in a square shape in plan view with four right angle prisms stuck together, and two dielectric multilayers are formed on interfaces obtained by sticking the right angle prisms together. The dielectric multilayers transmit a color light passing through the irradiation-side polarizing plate 443 disposed on a side (a G color light side) opposite the projection lens 3, and reflect color lights passing through the remaining two irradiation-side polarizing plates 443 (on an R color light side and a B color light side). In this way, each color light modulated by each incident-side polarizing plate 442, each liquid crystal panel 5, and each irradiation-side polarizing plate 443 is synthesized to form the color image.

The optical part housing 45 is a plastic box-like member in the interior of which, the predetermined illumination optical axis A being set, the heretofore described optical parts 41 to 44 are disposed in predetermined positions with respect to the illumination optical axis A. Although not shown in detail, a plurality of grooves in which to position and secure the individual optical parts 41 to 44 are formed inside the optical part housing 45.

3. Configuration of Optical Device Main Body 440

Figure 2:
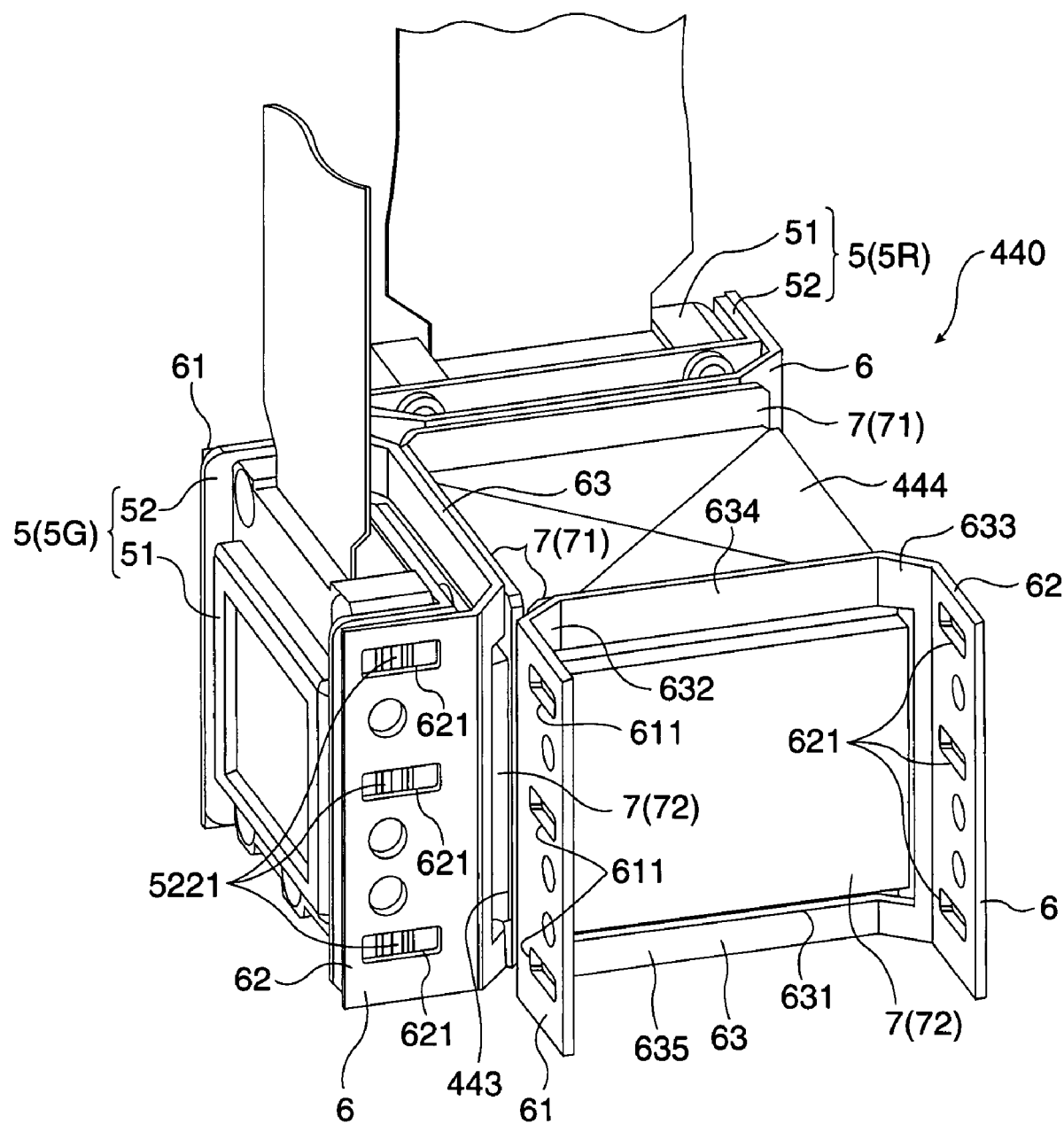
FIG. 2 is a perspective view showing an optical device main body in the embodiment.
Figure 3:
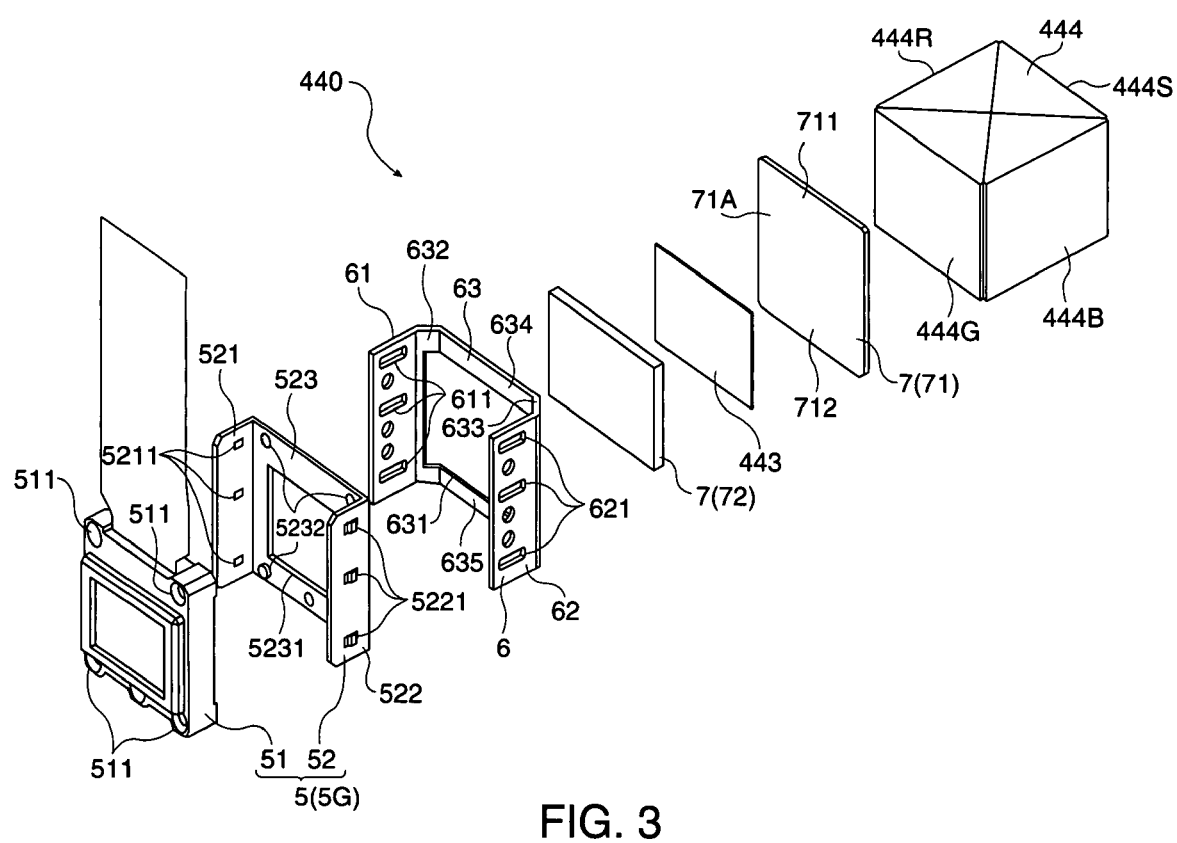
FIG. 3 is an exploded perspective view showing a configuration of the optical device main body in the embodiment.

FIG. 2 is a perspective view showing the optical device main body 440. Also, FIG. 3 is an exploded perspective view of the optical device main body 440. In order to make the configuration easier to understand, the liquid crystal panel 5B is omitted in FIG. 2, while only the optical parts disposed on the optical path of the green light are shown in FIG. 3.

The optical device main body 440 modulates incident luminous fluxes in accordance with the image information by means of the liquid crystal panels 5, forms color images in accordance with the incident luminous fluxes, synthesizes the color images in the cross dichroic prism (hereafter abbreviated as "prism" on occasion) 444, and forms the optical image (color image). The optical device main body 440, as heretofore described, being configured to include the liquid crystal panels 5, the irradiation-side polarizing plates 443, the prism 444, the holding members 6 and the pairs of light-transmissive substrates 7, is configured of these as a unit.

Hereafter, although a description will be given, from among luminous flux incidence surfaces of the prism 444 (a luminous flux incidence surface on which the red light is incident is designated by 444R, a luminous flux incidence surface on which the green light is incident by 444G, and a luminous flux incidence surface on which the blue light is incident by 444B), of a disposition and configuration of each member disposed on the luminous flux incidence surface 444G side, a configuration of other luminous flux incidence surfaces 444R and 444B is identical.

3-1. Configuration of Light-Transmissive Substrates 7

In the prism 444, as shown in FIG. 2 and FIG. 3, an irradiation-side substrate 71, configuring the pair of light-transmissive substrates 7, disposed on a luminous flux irradiation-side of the irradiation-side polarizing plate 443, is adhesively secured to the luminous flux incidence surface 444G on which the green light is incident.

The irradiation-side substrate 71 is formed to be larger than an external dimension of the irradiation-side polarizing plate 443, and larger than an external dimension of the luminous flux incidence surfaces 444R, 444G and 444B. To describe in detail, the irradiation-side substrate 71 is formed in such a way as to extend, when secured to the luminous flux incidence surface 444G, in an up-down direction perpendicular to an optical axis of the luminous flux incident on the luminous flux incidence surface 444G, and perpendicular to a direction in which each luminous flux incidence surface 444R, 444G and 444B is formed. Of these, a portion extending upward is designated as an upward extending portion 711, while a portion extending downward is designated as a downward extending portion 712. Also, the irradiation-side polarizing plate 443 is affixed to an approximate center of a luminous flux incidence surface 71A of the irradiation-side substrate 71.

An incident-side substrate 72 which, configuring the pair of light-transmissive substrates 7, sandwiches the irradiation-side polarizing plate 443 in conjunction with the irradiation-side substrate 71, is provided on a luminous flux incident-side of the irradiation-side polarizing plate 443 affixed to the luminous flux incidence surface 71A of the irradiation-side substrate 71. The incident-side substrate 72, being formed slightly larger than the external dimension of the irradiation-side polarizing plate 443, is affixed to a luminous flux incident-side surface of the irradiation-side polarizing plate 443 in such a way as to cover the irradiation-side polarizing plate 443.

The irradiation-side substrate 71 and the incident-side substrate 72 configuring the pair of light-transmissive substrates 7 can be made of crystal, sapphire, YAG crystallized glass, quartz, pyrex (registered trademark), white sheet glass or the like.

In this way, by sandwiching the irradiation-side polarizing plate 443 with the pair of light-transmissive substrates 7, as a heat generated in the irradiation-side polarizing plate 443 is transmitted to the incident-side substrate 72 and the irradiation-side substrate 71, it is possible to suppress a rise in temperature of the irradiation-side polarizing plate 443.

3-2. Configuration of Liquid Crystal Panel 5

The liquid crystal panel 5 is configured to include a panel main body 51, in an interior of which a liquid crystal element is hermetically enclosed, and a holding frame 52 which holds the panel main body 51.

Of these, the panel main body 51 is formed in a substantially rectangular box-like form as seen from the optical axis direction of the incident luminous flux. Also, the panel main body 51, as described heretofore, controls the orientation of the liquid crystal element enclosed in the interior in accordance with the drive signal received from the control unit, modulates the incident luminous flux as it passes through the liquid crystal element, and forms the color image in accordance with the incident luminous flux.

Seen from the optical axis direction of the luminous flux incident on the panel main body 51, a hole portion 511 which penetrates the panel main body 51 is formed in each of four corners of the panel main body 51.

The holding frame 52 is a metal member which is substantially U-shaped as seen from above, and substantially rectangular as seen from the optical axis direction of the incident luminous flux. A pair of plate-like portions 521 and 522 which extend in an up-down direction along the optical axis of the incident luminous flux, disposed facing each other, and a plate-like portion 523 which connects end portions on a luminous flux irradiation-side of the plate-like portions 521 and 522, are formed on the holding frame 52.

Of these, three each of protruding portions 5211 and 5221 are formed respectively on surfaces opposite to mutually facing surfaces of the plate-like portions 521 and 522, protruding in an out-of-plane direction. Specifically, the protruding portions 5211 and 5221 are formed in a vicinity of a top, an approximate center and a bottom of an exterior surface of the plate-like portions 521 and 522. Also, the protruding portions 5211 and 5221 fit respectively into apertures 611 and 621 of the holding member 6, to be described hereafter.

A substantially rectangular aperture 5231, through which the luminous flux emerging from the panel main body 51 is transmitted, is formed in an approximate center of the plate-like portion 523. The aperture 5231 is formed of a dimension corresponding to an image formation area of the panel main body 51, that is, an area in which the liquid crystal element is disposed.

Also, a screw hole 5232 is formed in each of four corners of the plate-like portion 523, and a screw (not shown) inserted through the hole portion 511 formed in the panel main body 51 screws into the screw hole 5232. By this means, the panel main body 51 is secured to the holding frame 52.

3-3. Configuration of Holding Member 6

Figure 4:
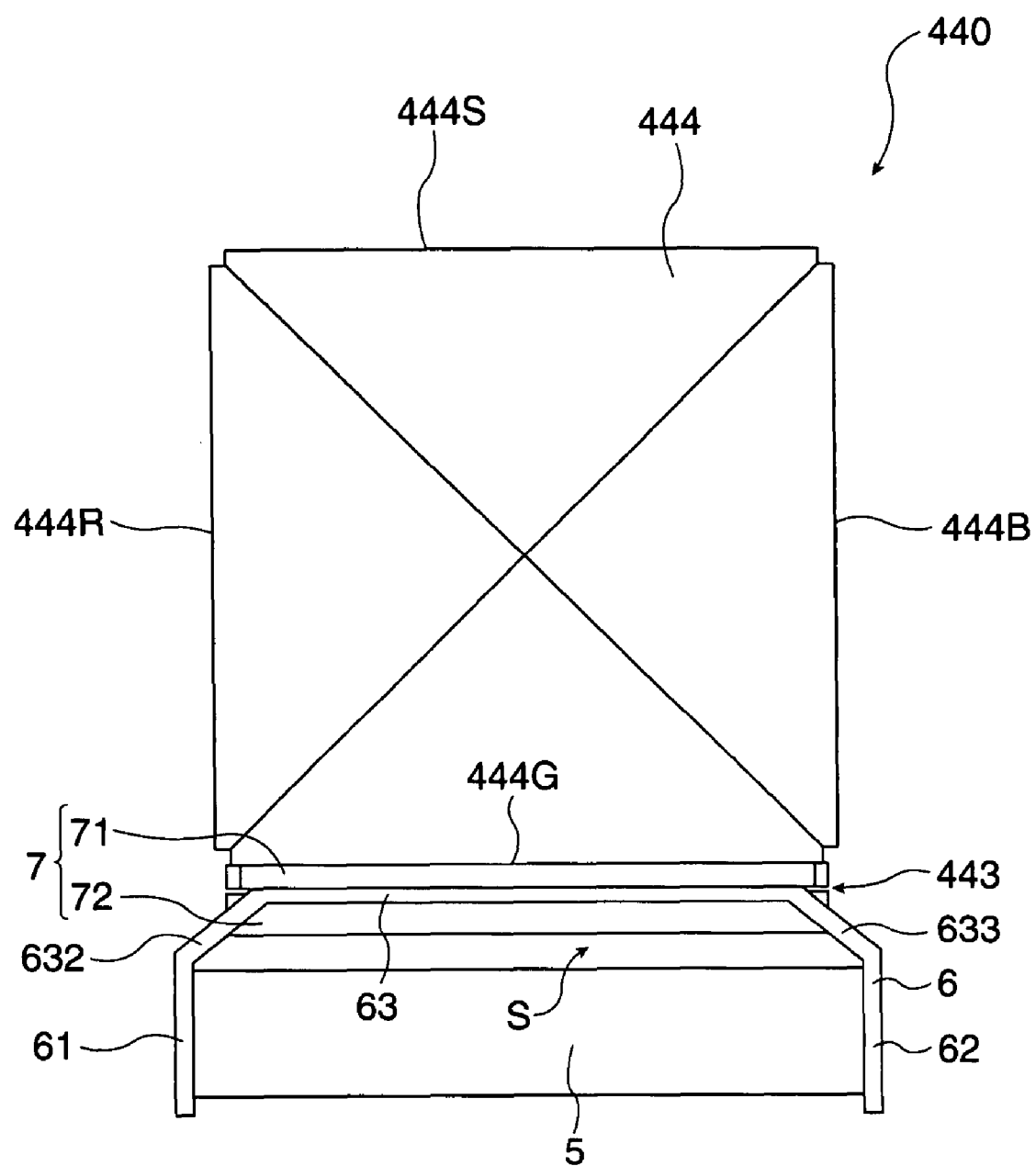
FIG. 4 is a plan view showing a situation in which a holding member and a pair of light-transmissive substrates in the embodiment are attached to a prism.
Figure 5:
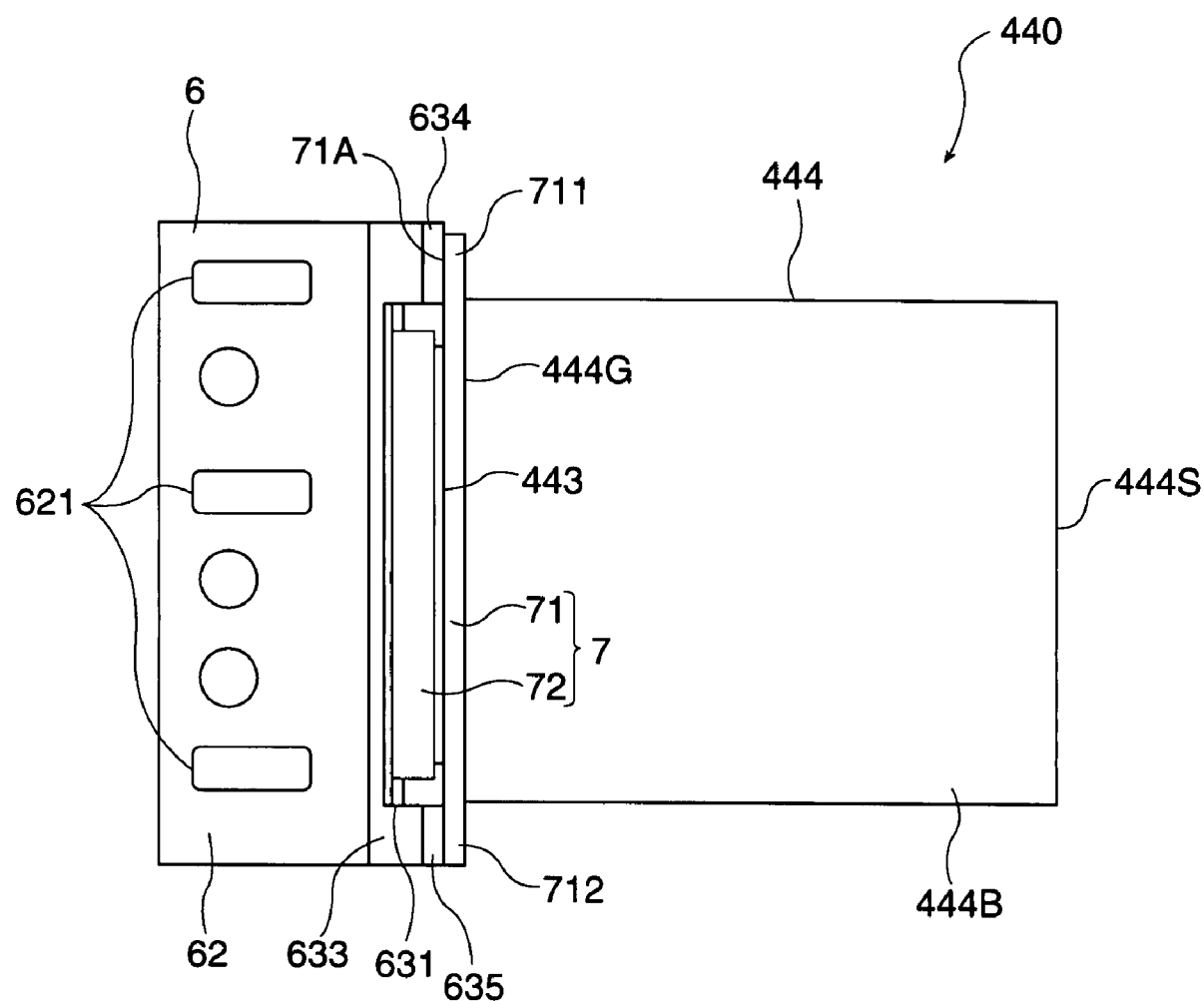
FIG. 5 is a side view showing the situation in which the holding member and the pair of light-transmissive substrates in the embodiment are attached to the prism.

FIG. 4 is a plan view of a situation, as seen from above, in which the holding member 6 and the pair of light-transmissive substrates 7 are attached to the prism 444. Also, FIG. 5 is a side view of the situation in which the holding member 6 and the pair of light-transmissive substrates 7 are attached to the prism 444. The liquid crystal panel 5 (5G) is omitted in FIG. 5.

The holding member 6, as described heretofore, being designed to hold the liquid crystal panel 5 in such a way as to cover it from the luminous flux irradiation-side, as shown in FIGS. 2 to 5, the holding member 6 is adhesively secured to the irradiation-side substrate 71 affixed to the luminous flux incidence surface 444G of the prism 444, in such a way as to cover the incident-side substrate 72 and the irradiation-side polarizing plate 443.

Like the holding frame 52, the holding member 6 is a metal member which is substantially U-shaped as seen from above, and substantially rectangular as seen from the optical axis direction of the incident luminous flux. The holding member 6 is configured to include a pair of plate-like portions 61 and 62 which extend in an up-down direction along the optical axis of the incident luminous flux, disposed facing each other, and a plate-like portion 63 which connects end portions on a luminous flux irradiation-side of the plate-like portions 61 and 62.

As shown in FIGS. 2, 3 and 5, three each of laterally long substantially rectangular apertures 611 and 621 are formed on the pair of plate-like portions 61 and 62, in positions corresponding respectively to the protruding portions 5211 and 5221 formed on the holding frame 52. By moving the liquid crystal panel 5 in the optical axis direction with respect to the holding member 6, with the protruding portions 5211 and 5221 fitted respectively into the apertures 611 and 621, a position adjustment of the liquid crystal panel 5 is carried out. The mutually facing surfaces of the plate-like portions 61 and 62 of the holding member 6, and the exterior surface of the holding frame 52 of the liquid crystal panel 5, are adhesively secured with an ultraviolet curable adhesive or the like.

As shown in FIG. 4, the plate-like portion 63 which connects the end portions on the luminous flux irradiation-side of the pair of plate-like portions 61 and 62 is formed in a substantial U-shape whereby, after coming mutually closer from the end portions on the luminous flux irradiation-side of the plate-like portions 61 and 62, and sloping toward the luminous flux irradiation-side, it is connected extending in a direction perpendicular to the pair of plate-like portions 61 and 62.

A substantially rectangular, as seen from the optical axis direction of the incident luminous flux, aperture 631 is formed in an approximate center of the plate-like portion 63. As shown in FIG. 2 and FIG. 4, the incident-side substrate 72 is exposed by the aperture 631, and the luminous flux emerging from the liquid crystal panel 5 is incident on the incident-side substrate 72 exposed by the aperture 631.

Herein, as a dimension between interior sides of the plate-like portions 61 and 62 is substantially the same as a horizontal direction dimension of the liquid crystal panel 5, when the holding member 6 holds the liquid crystal panel 5, the liquid crystal panel 5 is not positioned on the luminous flux irradiation-side of sloping portions 632 and 633 of the plate-like portion 63 in a vicinity of the plate-like portions 61 and 62 (a sloping portion connected to the plate-like portion 61 is designated by 632, and a sloping portion connected to the plate-like portion 62 by 633). For this reason, as shown in FIG. 4, when the holding member 6 is secured to the irradiation-side substrate 71, a gap S of a predetermined size is formed between the liquid crystal panel 5 and the incident-side substrate 72. A cooling air which cools a luminous flux irradiation-side surface of the liquid crystal panel 5 and the incident-side substrate 72 circulates in the gap S. By this means, not only is it possible to directly cool the liquid crystal panel 5, but it is also possible to cool heat generated in the liquid crystal panel 5 and transmitted to the holding member 6, and heat generated in the irradiation-side polarizing plate 443 and transmitted to the incident-side substrate 72. Consequently, it is possible to increase a cooling efficiency of the liquid crystal panel 5 and the irradiation-side polarizing plate 443.

As shown in FIG. 5, a luminous flux irradiation-side surface of horizontal portions 634 and 635, positioned above and below the aperture 631 of the plate-like portion 63, is adhesively secured with the ultraviolet curable adhesive or the like to the luminous flux incidence surface 71A of the irradiation-side substrate 71 affixed to the luminous flux incidence surfaces 444R, 444G and 444B of the prism 444. A position of the irradiation-side substrate 71 to which the horizontal portions 634 and 635 are adhesively secured is designated as the upward extending portion 711 and the downward extending portion 712 of the irradiation-side substrate 71 which extend in an up-down direction from the luminous flux incidence surface 444G of the prism 444.

To describe in detail, the horizontal portion 634 positioned in an upper portion of the plate-like portion 63 is adhesively secured in a position on the luminous flux incidence surface 71A of the irradiation-side substrate 71 corresponding to the upward extending portion 711, while the horizontal portion 635 positioned in a lower portion is adhesively secured in a position on the luminous flux incidence surface 71A corresponding to the downward extending portion 712. By this means, the holding member 6 is secured to the irradiation-side substrate 71.

3-4. Securing of Each Member

A description will be given of an attachment of the heretofore described irradiation-side polarizing plate 443, liquid crystal panel 5 and light-transmissive substrate 7 to the luminous flux incidence surface 444G.

Firstly, of the pair of light-transmissive substrates 7, the irradiation-side substrate 71 is disposed on the luminous flux incidence surface 444G of the prism 444. At this time, the irradiation-side substrate 71 is adhesively secured to the luminous flux incidence surfaces 444R, 444G and 444B in such a way that the up-down end portions (the upward extending portion 711 and the downward extending portion 712) extend upward and downward from the luminous flux incidence surface 444G on which the irradiation-side substrate 71 is disposed.

Subsequently, the irradiation-side polarizing plate 443 is affixed in the approximate center of the luminous flux incidence surface 71A of the irradiation-side substrate 71, and the incident-side substrate 72 is adhesively secured to the luminous flux incidence surface of the irradiation-side polarizing plate 443 in such a way as to cover the irradiation-side polarizing plate 443.

Next, the liquid crystal panel 5 (5G), which has the panel main body 51 screwed to the holding frame 52, is caused to be held by the holding member 6. At this time, the ultraviolet curable adhesive is applied between the plate-like portions 521 and 522 of the holding frame 52 and the plate-like portions 61 and 62 of the holding member 6, and the holding frame 52 is attached to the holding member 6 in such a way that the protruding portions 5211 and 5221 formed on the exterior surface of the plate-like portions 521 and 522 of the holding frame 52 fit respectively into the apertures 611 and 621 formed in the plate-like portions 61 and 62 of the holding member 6.

Subsequently, the holding member 6 holding the liquid crystal panel 5 is secured with the ultraviolet curable adhesive to the luminous flux incidence surface 71A of the irradiation-side substrate 71 secured to the luminous flux incidence surface 444G of the prism 444. Then, a portion of a luminous flux irradiation-side surface of the holding member 6 corresponding to the horizontal portion 634 is adhesively secured to a portion of the luminous flux incidence surface 71A of the irradiation-side substrate 71 corresponding to the upward extending portion 711, while a portion corresponding to the horizontal portion 635 is secured to a portion of the luminous flux incidence surface 71A corresponding to the downward extending portion 712.

Then, after carrying out the position adjustment of the liquid crystal panel 5, the irradiation-side polarizing plate 443, liquid crystal panel 5, holding member 6 and light-transmissive substrate 7 are secured to the luminous flux incidence surface 444G of the prism 444 by irradiating each member with an ultraviolet ray.

According to the projector 1 in the embodiment heretofore described, a following advantage can be achieved.

That is, the holding member 6 holding the liquid crystal panel 5G is adhesively secured to the luminous flux incidence surface 71A of the irradiation-side substrate 71 adhesively secured to the luminous flux incidence surface 444G of the prism 444. Accordingly, as seen from the liquid crystal panel 5G, it is possible to reduce adhesive layers interposed between it and the prism 444.

To describe in detail, for example, in the event that the holding member 6 is adhesively secured to the incident-side substrate 72 which, in conjunction with the irradiation-side substrate 71, sandwiches the irradiation-side polarizing plate 443, there exists a total of four adhesive layers, one each between the prism 444 and the irradiation-side substrate 71, between the irradiation-side substrate 71 and the irradiation-side polarizing plate 443, between the irradiation-side polarizing plate 443 and the incident-side substrate 72, and between the incident-side substrate 72 and the holding member 6. In response to this, as the holding member 6 is adhesively secured to the irradiation-side substrate 71, it is possible to have a total of two adhesive layers, one each between the prism 444 and the irradiation-side substrate 71, and between the irradiation-side substrate 71 and the holding member 6. By this means, it is possible to reduce the number of interposed adhesive layers. Consequently, it being possible to make it difficult for the displacement of the liquid crystal panel 5G due to an adhesive layer aging change to occur, it is possible to achieve a lengthening in a lifespan of the optical device 44. Also, it is possible to easily carry out the position adjustment of the liquid crystal panel 5G. It is also possible to achieve this kind of advantage in the same way for the liquid crystal panels 5R and 5B.

Also, as the holding member 6 is adhesively secured to the luminous flux incidence surface 71A of the irradiation-side substrate 71, as well as being possible to easily carry out the attachment of the holding member 6, it is possible to easily carry out the position adjustment of the liquid crystal panel 5 held by the holding member 6.

Furthermore, as there is no need to separately provide a kind of member which holds the irradiation-side polarizing plate 443 and the pair of light-transmissive substrates 7 which hold the irradiation-side polarizing plate 443, it is possible to simplify the construction of the optical device main body 440, and by extension it is possible to simplify a manufacturing process of the projector 1. Also, as the component members are reduced in this way, it is possible to simplify a process of a dismantling etc. of the projector 1, and it is possible to increase a recyclability of the product.

Also, with regard to the attachment of the holding member 6 to the irradiation-side substrate 71, the luminous flux irradiation-side surfaces of the horizontal portions 634 and 635 of the holding member 6 are affixed in positions on the luminous flux incidence surface 71A of the irradiation-side substrate 71 corresponding to the upward extending portion 711 and the downward extending portion 712. Accordingly, it is possible to achieve an enlargement of the irradiation-side polarizing plate 443 and a downsizing of the prism 444.

To describe in detail, as it is no longer necessary to secure an area on the irradiation-side substrate 71 for attaching the holding member 6, within an area corresponding to the luminous flux incidence surfaces 444R, 444G and 444B of the prism 444, it becomes possible to enlarge the irradiation-side polarizing plate 443 affixed to the luminous flux incidence surface 71A of the irradiation-side substrate 71. By this means, as it becomes possible to dispose the irradiation-side polarizing plate 443 having a dimension larger than the image formation area of the liquid crystal panel 5, it becomes possible to reliably cause the luminous flux emerging from the liquid crystal panel 5 to fall incident on the irradiation-side polarizing plate 443.

Contrarily, in the event that an adhesion area of the holding member 6 is within an area of the irradiation-side substrate 71 corresponding to the luminous flux incidence surfaces 444R, 444G and 444B, unless the dimension of the irradiation-side polarizing plate 443 is changed, it is necessary to enlarge the luminous flux incidence surfaces 444R, 444G and 444B of the prism 444 in order to secure the adhesion area of the holding member 6 on the irradiation-side substrate 71. In response to this, by adhesively securing the holding member 6 to the luminous flux incidence surface 71A of the irradiation-side substrate 71 corresponding to the upward extending portion 711 and the downward extending portion 712 extending upward and downward from the luminous flux incidence surfaces 444R, 444G and 444B, it is possible to make the luminous flux incidence surfaces 444R, 444G and 444B of the prism 444 smaller. Consequently, it is possible to achieve the downsizing of the prism 444.

Also, the adhesion area of the holding member 6 on the irradiation-side substrate 71 is designated as the upward extending portion 711, which is the portion extending upward from the luminous flux incidence surfaces 444R, 444G and 444B of the prism 444, and the downward extending portion 712 which extends downward. Accordingly, for example, as the luminous flux incidence surfaces 444R and 444B are positioned in a direction horizontal to the luminous flux incidence surface 444G of the prism 444, in the event that the irradiation-side substrate 71 extends in a horizontal direction, it interferes with the irradiation-side substrate 71 adhesively secured to another luminous flux incidence surface. In response to this, as an extension direction of the irradiation-side substrate 71 is an up-down direction, it is possible to eliminate this kind of interference and dispose the irradiation-side substrate 71 appropriately on each of the luminous flux incidence surfaces 444R, 444G and 444B. Consequently, it is possible to dispose the irradiation-side substrate 71 and the holding member 6 on each luminous flux incidence surface 444R, 444G and 444B. Also, by this means, it is possible to achieve advantages, such as the heretofore described suppression of the displacement of the liquid crystal panel 5 and the ease of securing the holding member 6, for all of the liquid crystal panels 5 (5R, 5G and 5B) and the holding member 6.

Furthermore, by the sloping portions 632 and 633 being formed on the plate-like portion 63 of the holding member 6, it being possible to form the gap S between the liquid crystal panel 5 held by the holding member 6 and the incident-side substrate 72 exposed by the aperture 631 formed in the plate-like portion 63, it is possible to circulate the cooling air in the gap S. Accordingly, not only is it possible to directly cool the luminous flux emergence surface of the liquid crystal panel 5, but it is also possible to cool the holding member 6 to which the heat of the liquid crystal panel 5 is transmitted, and the incident-side substrate 72 to which the heat of the irradiation-side polarizing plate 443 is transmitted. Consequently, it is possible to efficiently cool the liquid crystal panel 5 and the irradiation-side polarizing plate 443.

Second Embodiment

Next, a projector according to a second embodiment of the invention will be described.

Although the projector in the embodiment has a configuration identical to that of the projector 1 shown in the first embodiment, a form of a holding member holding the liquid crystal panel 5 is different from that of the projector 1. In the following description, with regard to a portion which is identical to, or substantially identical to, a previously described portion, an identical reference number is appended and a description is omitted.

Although a detailed illustration is omitted, the projector of the embodiment, in the same way as the heretofore described projector 1, includes, as well as the optical unit 4, the cooling unit, the power source unit, the control unit etc., and the exterior housing 2 which stores the aforementioned in the interior.

Of these, the optical unit 4, modulating the luminous flux emitted from the light source and forming and projecting the optical image in response to the image information, includes the illumination optical device 41, the color separation optical device 42, the relay optical device 43, the optical device 44, the optical part housing 45 and the projection lens 46. Of these, the optical device 44 is configured to include an optical device main body 440A in place of the optical device main body 440.

Figure 6:
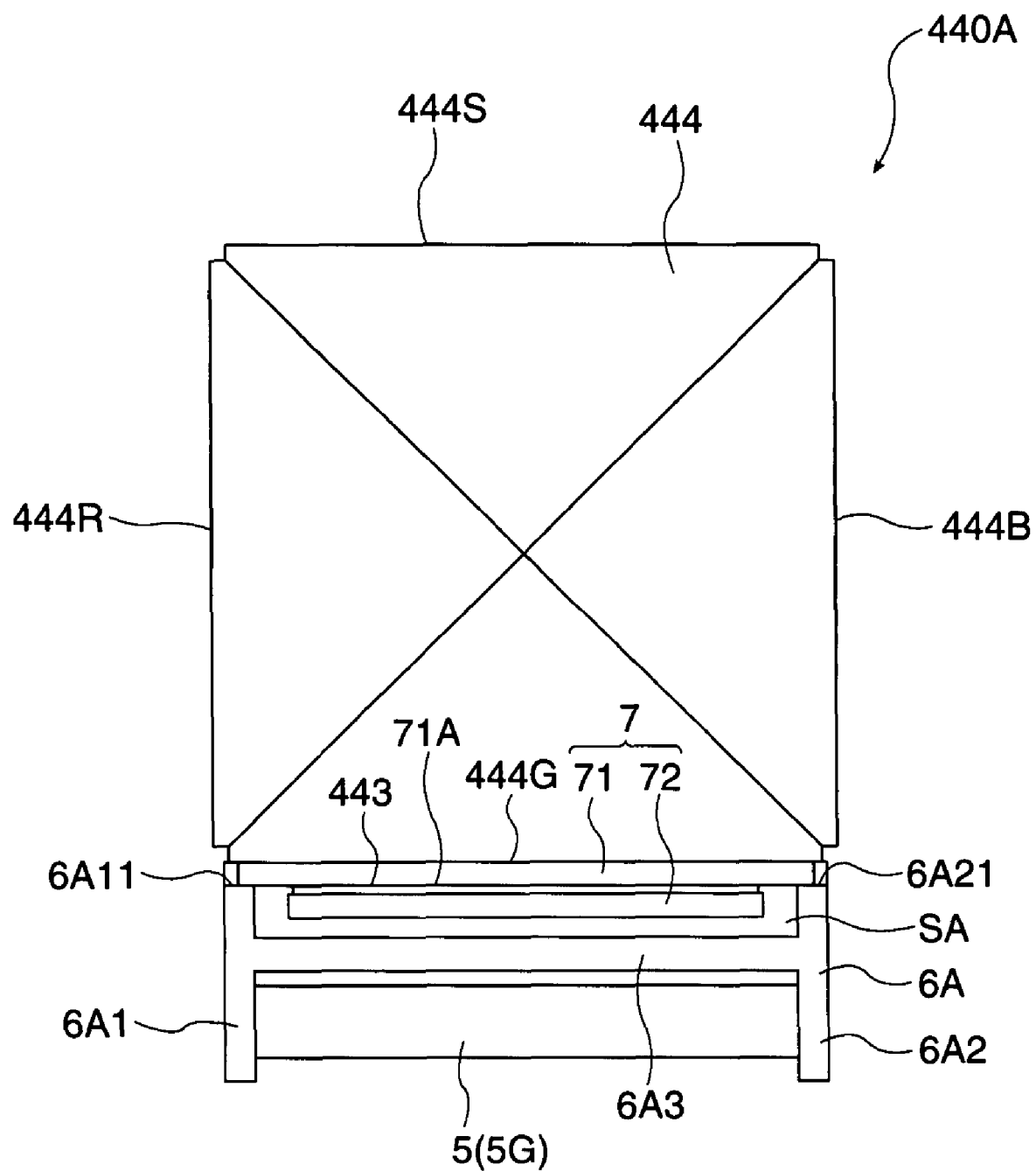
FIG. 6 is a plan view showing a holding member provided in a projector according to a second embodiment of the invention.

FIG. 6 is a plan view showing the optical device main body 440A of the embodiment. Each member disposed on the luminous flux incidence surfaces 444R and 444B sides of the prism 444 is omitted in the figure.

As shown in FIG. 6, the optical device main body 440A is configured to include the prism 444, the irradiation-side substrate 71 adhesively secured to the luminous flux incidence surface 444G of the prism 444 on which the green light falls incident, the irradiation-side polarizing plate 443 affixed to the irradiation-side substrate 71, the incident-side substrate 72 secured in such a way as to cover the irradiation-side polarizing plate 443, the liquid crystal panel 5 (5G), and a holding member 6A, adhesively secured to the irradiation-side substrate 71, which holds the liquid crystal panel 5 (5G).

Although omitted in FIG. 6, a configuration of the luminous flux incidence surfaces 444R and 444G of the prism 444 is identical. Also, in the embodiment, the irradiation-side substrate 71, being formed to substantially the same size as each of the luminous flux incidence surfaces 444R, 444G and 444B of the prism 444, is adhesively secured aligned with the luminous flux incidence surfaces 444R, 444G and 444B.

The holding member 6A, being formed in a substantial H-shape as seen from above, is formed in a substantial rectangle as seen from the optical axis direction of the luminous flux incident on the liquid crystal panel 5 held by the holding member 6A. The holding member 6A is adhesively secured to the luminous flux incidence surface 71A of the irradiation-side substrate 71, in such a way as to cover the incident-side substrate 72 and the irradiation-side polarizing plate 443. A pair of plate-like portions 6A1 and 6A2 which, as well as following the optical axis of the luminous flux incident on the liquid crystal panel 5, extend in an up-down direction disposed facing each other, and a plate-like portion 6A3 which links approximate centers of the plate-like portions 6A1 and 6A2 in a direction following the optical axis of the incident luminous flux, are formed on the holding member 6A.

Of these, although a detailed illustration is omitted, apertures having a laterally long substantially rectangular form, identical to that of the apertures 611 and 621 formed in the heretofore described holding member 6, are formed respectively at a top, an approximate center and a bottom in a range from an end on a luminous flux incident-side of the pair of plate-like portions 6A1 and 6A2 as far as the plate-like portion 6A3. The protruding portions 5211 and 5221 (refer to FIG. 3) formed on the liquid crystal panel 5 fit into the apertures. Also, an ultraviolet curable adhesive being applied to the mutually facing surfaces of the plate-like portions 6A1 and 6A2, the liquid crystal panel 5, after the position adjustment, is secured to the holding member 6A by means of the adhesive.

Although a detailed illustration is omitted, an aperture of a substantially rectangular form is formed in an approximate center of the plate-like portion 6A3. When the holding member 6A holds the liquid crystal panel 5, the aperture is formed in a position corresponding to the image formation area of the liquid crystal panel 5, in accordance with the dimension of the image formation area. The luminous flux emerging from the liquid crystal panel 5 falls incident on the incident-side substrate 72 via the aperture, whereon the luminous flux falls incident on the irradiation-side polarizing plate 443 via the incident-side substrate 72.

Herein, end surfaces 6A11 and 6A21 on a luminous flux irradiation-side of the pair of plate-like portions 6A1 and 6A2 are designated as adhesive surfaces adhesively secured to the luminous flux incidence surface 71A of the irradiation-side substrate 71 affixed to the luminous flux incidence surface 444G of the prism 444. That is, the ultraviolet curable adhesive being applied to the end surfaces 6A11 and 6A21, the end surfaces 6A11 and 6A21 are each affixed in a vicinity of an end portion in a horizontal direction of the luminous flux incidence surface 71A of the irradiation-side substrate 71. By this means, it is possible to secure the holding member 6A to the irradiation-side substrate 71.

Herein, in the plate-like portions 6A1 and 6A2, a dimension from a luminous flux irradiation-side surface of the plate-like portion 6A3 as far as the end surfaces 6A11 and 6A21, which are surfaces of the end portions of the plate-like portions 6A1 and 6A2, is formed larger than a dimension from the luminous flux incidence surface 71A of the irradiation-side substrate 71 to a luminous flux incidence surface of the incident-side substrate 72. For this reason, a gap SA of a predetermined size is formed between a luminous flux irradiation-side surface of the plate-like portion 6A3 and the luminous flux incidence surface of the incident-side substrate 72. In the same way as in the case of the heretofore described holding member 6, a cooling air circulates in the gap S which, as well as directly cooling the luminous flux emergence surface of the liquid crystal panel 5, cools the heat generated in the liquid crystal panel 5 and transmitted to the holding member 6A, and the heat generated in the irradiation-side polarizing plate 443 and transmitted to the incident-side substrate 72.

According to the projector in the embodiment heretofore described, an advantage identical to that of the heretofore described projector 1 can be achieved.

That is, the holding member 6A holding the liquid crystal panel 5 is adhesively secured to the luminous flux incidence surface 71A of the irradiation-side substrate 71 adhesively secured to the luminous flux incidence surfaces 444R, 444G and 444B of the prism 444. Accordingly, compared to the case in which the holding member 6A is secured to the incident-side substrate 72, it is possible to reduce adhesive layers interposed from the liquid crystal panel 5 as far as the prism 444. Consequently, it is possible to make it difficult for the displacement of the liquid crystal panel 5G to occur. Consequently, it is possible to make it difficult for an optical axis displacement of the liquid crystal panel 5G to occur.

As the holding member 6A is adhesively secured to the irradiation-side substrate 71, it is possible to easily carry out an attachment of the holding member 6A. Also, with regard to a securing of the holding member 6A, the pair of light-transmissive substrates 7 and the irradiation-side polarizing plate 443, as there is no longer a need to provide another member, it is possible to simplify the construction of the optical device main body 440A, and by extension the configuration of the projector. By this means, it being possible to simplify a manufacturing process and a dismantling process of the projector, it is possible to increase a recyclability of the product.

Furthermore, as it is possible to form the gap SA between the plate-like portion 6A3 of the holding member 6A and the incident-side substrate 72, it is possible to circulate the cooling air in the gap SA. Consequently, as it is possible to cool the liquid crystal panel 5, the holding member 6A and the incident-side substrate 72, it is possible to increase a cooling efficiency of the liquid crystal panel 5 held by the holding member 6A and of the irradiation-side polarizing plate 443.

Modifications of Embodiment

Although one configuration for implementing the disclosure has been disclosed in the above description, the disclosure is not limited to this. That is, as a description regarding a form, a material and the like heretofore disclosed has been given as an example in order to make it easy to understand the disclosure, and not to limit the disclosure, a description with a name of a member removing a part or all of a limitation of the form, the material and the like is included in the disclosure.

Although, in each of the embodiments heretofore described, the holding members 6 and 6A are adhesively secured to the luminous flux incidence surface 71A of the irradiation-side substrate 71, the invention is not limited to this. For example, it is also acceptable to have a configuration in which the holding members 6 and 6A are secured to a luminous flux irradiation-side surface of the irradiation-side substrate 71, and it is also acceptable to have a configuration in which the holding members 6 and 6A are secured to a side surface connecting the luminous flux incidence surface 71A and the luminous flux irradiation-side surface of the irradiation-side substrate 71.

Although, in each of the embodiments heretofore described, the liquid crystal panels 5 (5R, 5G and 5B) are each held by the holding members 6 and 6A, and the holding members 6 and 6A are adhesively secured to the irradiation-side substrate 71 secured to the luminous flux incidence surfaces 444R, 444G and 444B of the prism 444, the invention not being limited to this, it is sufficient that at least one of the liquid crystal panels 5 (5R, 5G and 5B) is held by the holding members 6 and 6A, and secured to the irradiation-side substrate 71.

Although, in the heretofore described first embodiment, the irradiation-side substrate 71 is formed larger up and down than the luminous flux incidence surfaces 444R, 444G and 444B of the prism 444, and the irradiation-side substrate 71 is secured in such a way as to extend in an up-down direction from each of the luminous flux incidence surfaces 444R, 444G and 444B, the invention is not limited to this. For example, it is also acceptable to form it so as to have a dimension substantially the same as that of each of the luminous flux incidence surfaces 444R, 444G and 444B. In this kind of case, it is sufficient that the holding member 6 is secured to the irradiation-side substrate 71, avoiding the irradiation-side polarizing plate 443 and the incident-side substrate 72.

Also, although, in the heretofore described first embodiment, the irradiation-side substrate 71 includes the upward extending portion 711, which extends upward with respect to the luminous flux incidence surfaces 444R, 444G and 444B of the prism 444, and the downward extending portion 712 which extends downward, the invention is not limited to this. For example, it is also acceptable to dispose the irradiation-side substrate 71 so as to extend in a horizontal direction with respect to the luminous flux incidence surfaces of the prism 444.

Although, in the heretofore described second embodiment of the invention, the end surfaces 6A11 and 6A21 of the holding member 6A are each affixed in the vicinity of the end portion in the horizontal direction of the luminous flux incidence surface 71A of the irradiation-side substrate 71, the invention not being limited to this, it is also acceptable that each of them is affixed in a vicinity of an end portion in an up-down direction (a height direction). That is, it is also acceptable to have a configuration in which the plate-like portions 6A1 and 6A2 extend following a horizontal direction, while the end surfaces 6A11 and 6A21 on the luminous flux irradiation-side of the plate-like portions 6A1 and 6A2 are each affixed in the vicinity of the end portion in the up-down direction of the luminous flux incidence surface 71A of the irradiation-side substrate 71.

Although, in the heretofore described second embodiment of the invention, the holding member 6A is affixed to the luminous flux incidence surface 71A of the irradiation-side substrate 71 by the end surfaces 6A11 and 6A21 on the luminous flux irradiation-side of the plate-like portions 6A1 and 6A2 which configure the holding member 6A, the invention is not limited to this. For example, it is also acceptable that a holding member is secured to the irradiation-side substrate 71 by means of a protruding portion which protrudes in an out-of-plane direction from a luminous flux irradiation-side surface of a plate-like portion connecting an opposing pair of plate-like portions. Also, in this kind of case, it is acceptable that the protruding portion is formed in each of four corners of the plate-like portion on which the protruding portion is formed, or it is also acceptable that it is formed in an approximate center of each side configuring the plate-like portion.

Although, in each of the heretofore described embodiments, the gaps S and SA are formed between the luminous flux incidence surface of the incident-side substrate 72 and the liquid crystal panel 5, the invention not being limited to this, it is also acceptable to dispose the incident-side substrate 72 and the liquid crystal panel 5 in such a way that they make contact with each other.

Although, in each of the heretofore described embodiments, the irradiation-side polarizing plate 443 is shown as the example of the optical element, the invention not being limited to this, it is also acceptable to use, for example, a view angle control filter which controls a view angle of the optical image, a color filter which transmits a color light of a predetermined wavelength, or the like.

Also, although, in each of the heretofore described embodiments, the configuration is such that the irradiation-side polarizing plate 443 serving as the optical element is sandwiched by the pair of light-transmissive substrates 7, the invention not being limited to this, it is also acceptable to dispose a separate optical element on a luminous flux incident-side of the incident-side substrate 72.

Although, in each of the heretofore described embodiments, the projector 1 includes the three liquid crystal panels 5R, 5G and 5B, the invention is not limited to this. That is, the invention can also be applied to a projector using two or less, or four or more, liquid crystal panels.

Also, although, in each of the heretofore described embodiments, the description has been given of the configuration in which the optical unit 4 has the substantially L-shaped form in plan view, not being limited to this, it is also acceptable to employ, for example, a configuration in which it has a substantially U-shaped form in plan view.

Furthermore, although, in each of the heretofore described embodiments, the transmissive liquid crystal panel 5 in which the luminous flux incidence surface and the luminous flux emergence surface differ has been used, it is also acceptable to use a reflective liquid crystal panel in which a luminous flux incidence surface and a luminous flux emergence surface are identical.

Although, in each of the heretofore described embodiments, the projector 1 furnished with the liquid crystal panel 5 is shown as the example of the optical modulation device, as long as it is an optical modulation device which forms the optical image by modulating the incident luminous flux in accordance with the image information, it is acceptable to employ an optical modulation device which has another configuration.

Also, although, in each of the heretofore described embodiments, only the front type projector 1, which carries out an image projection from a direction of viewing the screen, is shown as the example, the invention can also be applied to a rear type projector, which carries out the image projection from a side opposite to the direction of viewing the screen.

The invention can be used in an optical device, and in particular it can be most effectively used in an optical device employed in a projector.

The entire disclosure of Japanese Patent Application No. 2006-059502, filed Mar. 6, 2006 is expressly incorporated by reference herein.

What is claimed is:

1. An optical device comprising:
a plurality of optical modulation devices which modulate an incident luminous flux in accordance with image information;
an optical element provided on a luminous flux irradiation-side of each optical modulation device which optically converts the luminous flux emerging from each of the optical modulation devices;
a prism having a plurality of luminous flux incidence surfaces positioned on a luminous flux irradiation-side of each optical element, the prism forming an optical image by synthesizing a luminous flux emerging from each optical element;
a holding member which holds at least one of the plurality of optical modulation devices; and
a pair of light-transmissive substrates which sandwich the optical element, the pair of light-transmissive substrates comprised of an incident-side substrate disposed on a luminous flux incident-side of the optical element and an irradiation-side substrate disposed on the luminous flux irradiation-side of the optical element, wherein
the irradiation-side substrate has a dimension larger than that of the optical element and includes an upward extending portion which extends above the one of the luminous flux incidence surfaces and a downward extending portion which extends below the one of the luminous flux incidence surfaces, and is secured to the one of the luminous flux incidence surfaces of the prism, and
the holding member has an aperture through which the luminous flux emerging from the optical modulation device passes, the holding member secured to the prism by being affixed to a surface of the upward extending portion and the downward extending portion of the irradiation-side substrate so as to cover the optical element.

2. The optical device according to claim 1, wherein
a gap of a predetermined size is provided between the incident-side substrate and the optical modulation device held by the holding member.

3. A projector comprising:
a light source; and
the optical device according to claim 1, wherein
the optical modulation device is disposed on an optical axis of an luminous flux emitted from the light source.

4. The projector according to claim 3, wherein
a gap of a predetermined size is provided between the incident-side substrate and the optical modulation device held by the holding member.

5. The optical device according to claim 1, wherein the holding member is only affixed to the irradiation-side substrate on the upward extending portion and the downward extending portion.

6. The optical device according claim 1, wherein the optical element is an irradiation-side polarizing plate and the pair of light-transmissive substrates that sandwich the polarizing plate are non-polarizing substrates selected from the group of materials consisting of crystal, sapphire, quartz, and glass.

* * * * *